Figure 1:
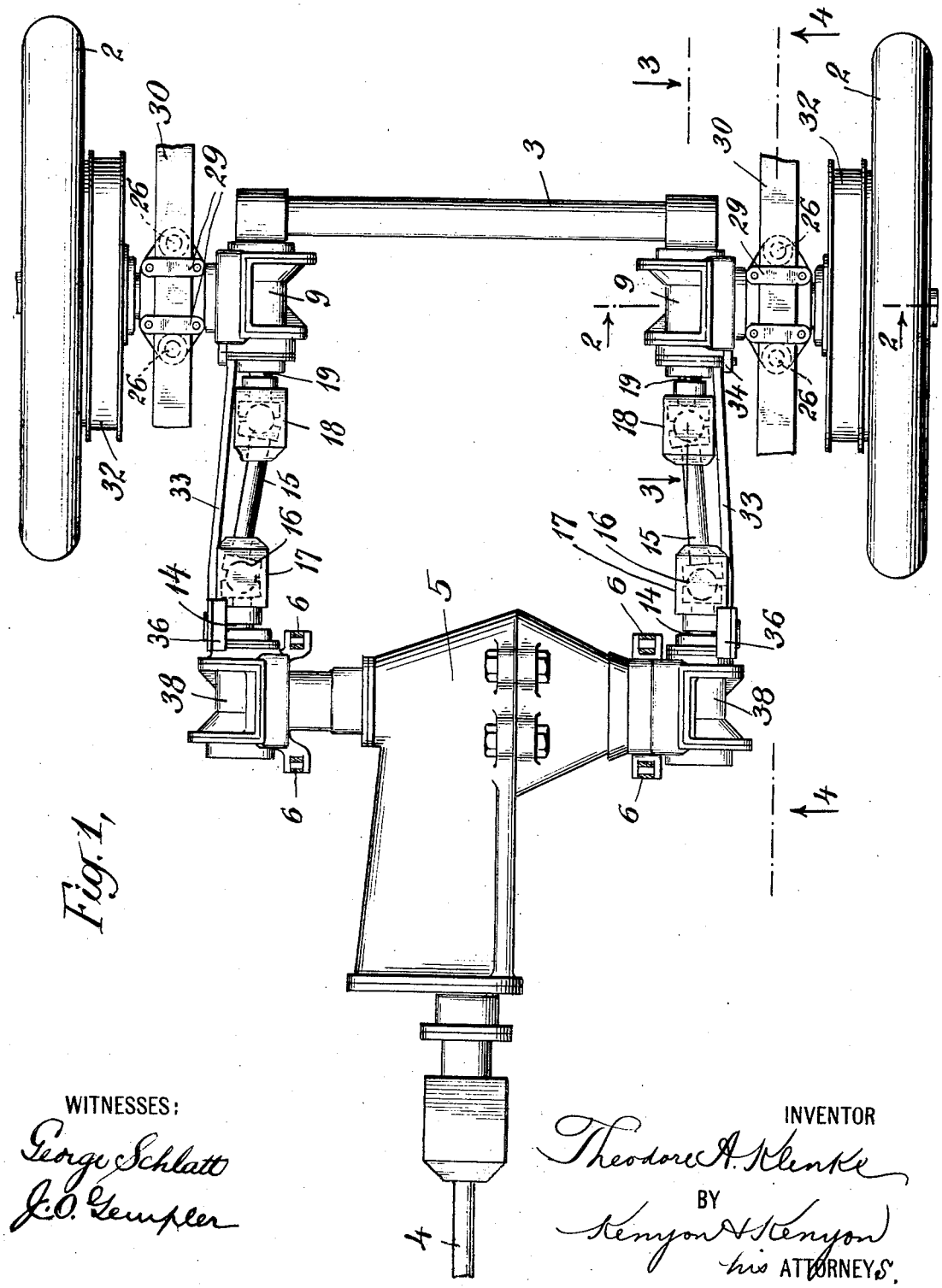

T. A. KLENKE.
PNEUMATIC SUSPENSION DEVICE FOR SHAFT DRIVEN MOTOR VEHICLES.
APPLICATION FILED APR. 6, 1912.

1,119,020.

Patented Dec. 1, 1914.

6 SHEETS—SHEET 1.

WITNESSES:
George Schlatt
J. O. Tempier

INVENTOR
Theodore A. Klenke
BY
Kenyon & Kenyon
his ATTORNEYS.

T. A. KLENKE.
PNEUMATIC SUSPENSION DEVICE FOR SHAFT DRIVEN MOTOR VEHICLES.
APPLICATION FILED APR. 6, 1912.

1,119,020.

Patented Dec. 1, 1914.
6 SHEETS—SHEET 3.

WITNESSES:

INVENTOR

T. A. KLENKE.
PNEUMATIC SUSPENSION DEVICE FOR SHAFT DRIVEN MOTOR VEHICLES.
APPLICATION FILED APR. 6, 1912.
1,119,020.
Patented Dec. 1, 1914.
6 SHEETS—SHEET 4.
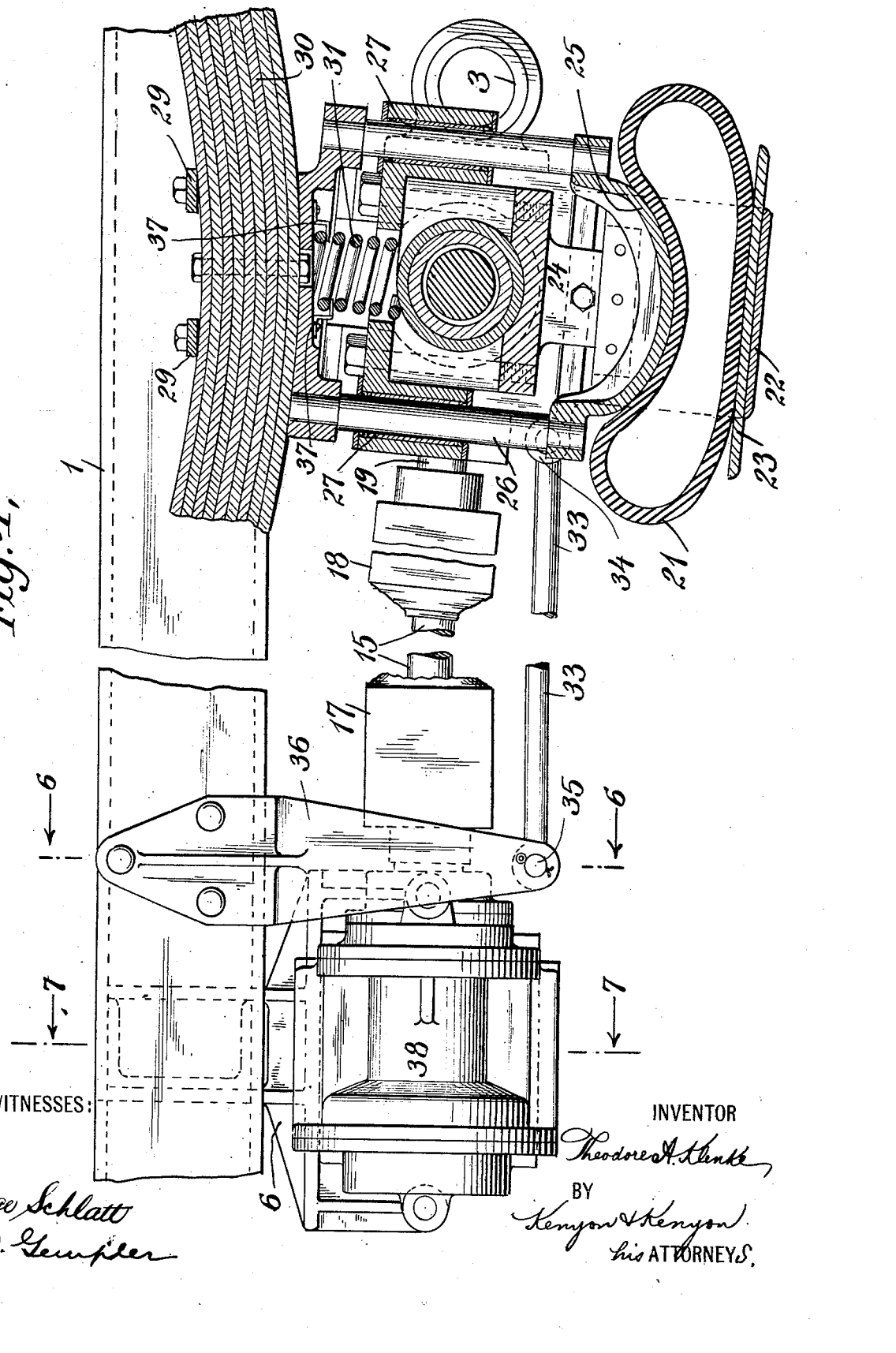

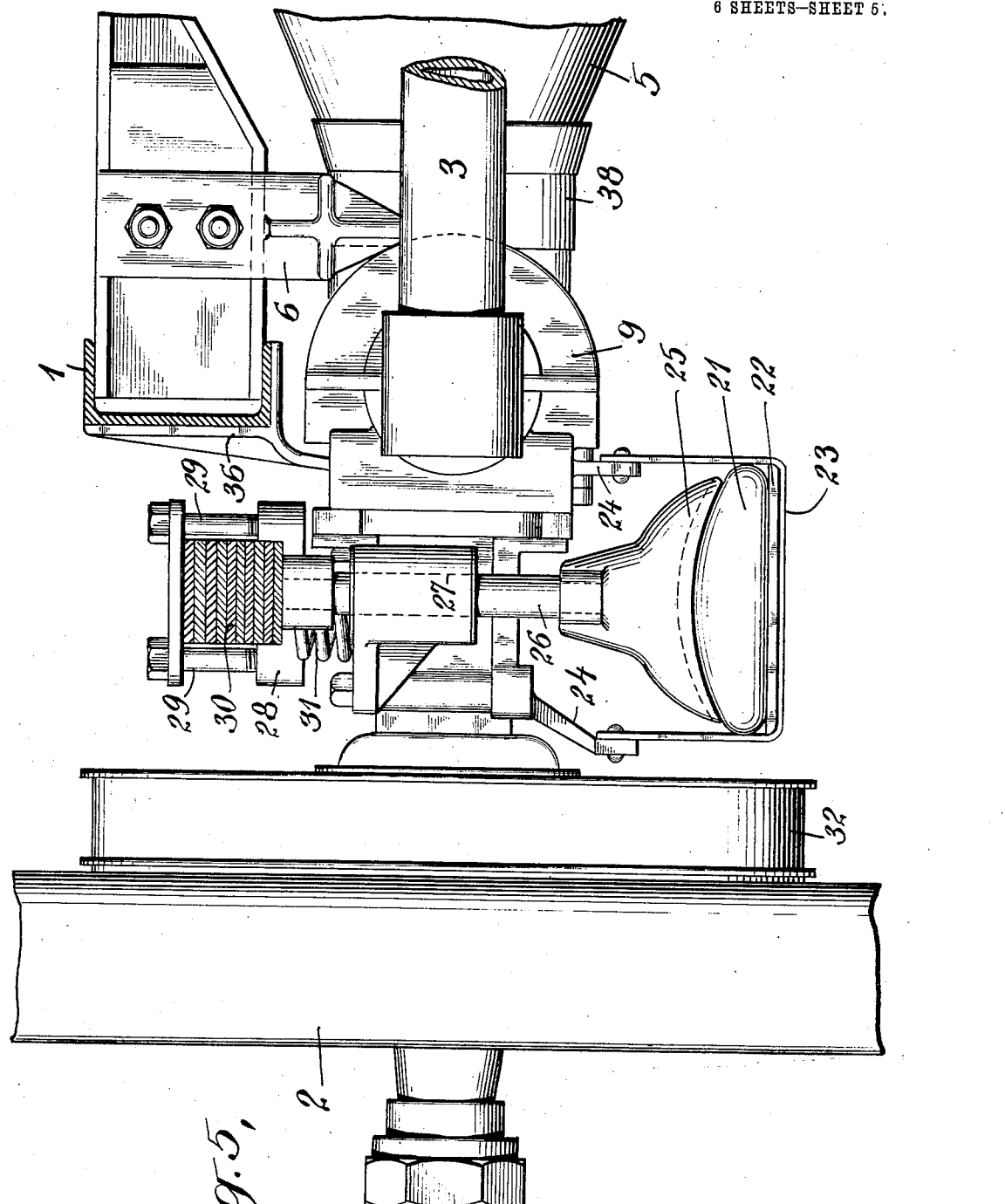

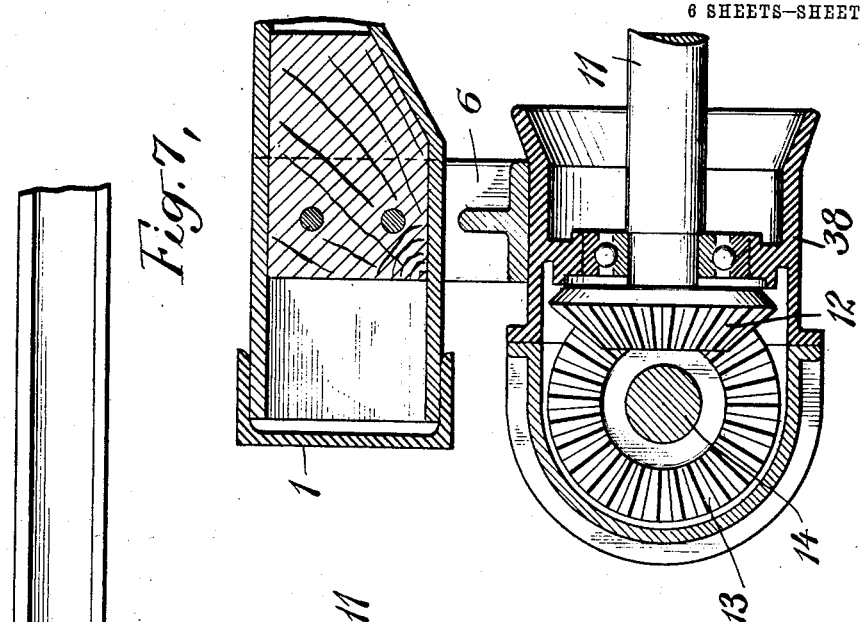
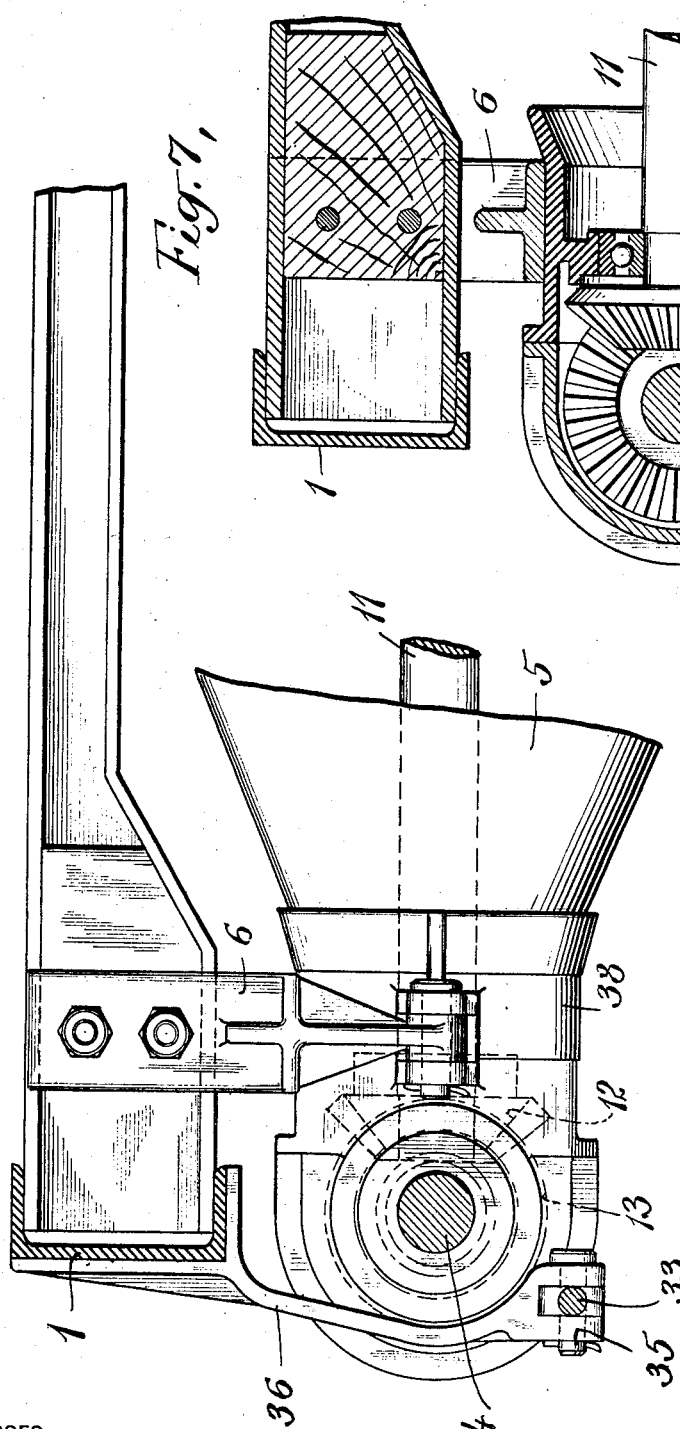

UNITED STATES PATENT OFFICE.

THEODORE A. KLENKE, OF NEW YORK, N. Y., ASSIGNOR TO KLENKE CUSHION AXLE COMPANY, A CORPORATION OF NEW YORK.

PNEUMATIC SUSPENSION DEVICE FOR SHAFT-DRIVEN MOTOR-VEHICLES.

1,119,020. Specification of Letters Patent. Patented Dec. 1, 1914.

Application filed April 6, 1912. Serial No. 688,870.

*To all whom it may concern:*

Be it known that I, THEODORE A. KLENKE, a citizen of the United States, and a resident of the city of New York, in the county and State of New York, have invented a new and useful Improvement in Pneumatic Suspension Devices for Shaft-Driven Motor-Vehicles, of which the following is a specification.

My improvement relates to pneumatic suspension devices for shaft driven motor vehicles.

It has for its object to so connect a driving wheel of the vehicle with the differential of the driving mechanism of the car as to permit the use in such connection of a pneumatic cushion capable of being compressed vertically but protected from side strains and so as to permit the differential to be supported on the chassis or body of the car and thus be itself cushioned, and preferably spring supported, and yet have the driving connections between it and the wheel direct and positive and at the same time of such character as to permit vertical play of the wheel without imparting side strains to the pneumatic cushion and also at the same time to permit of the use of a solid rear axle.

It consists in the novel devices and combinations herein shown and described.

In the drawings accompanying this specification and forming part hereof I have shown the preferred form of my improvement.

Figure 2:
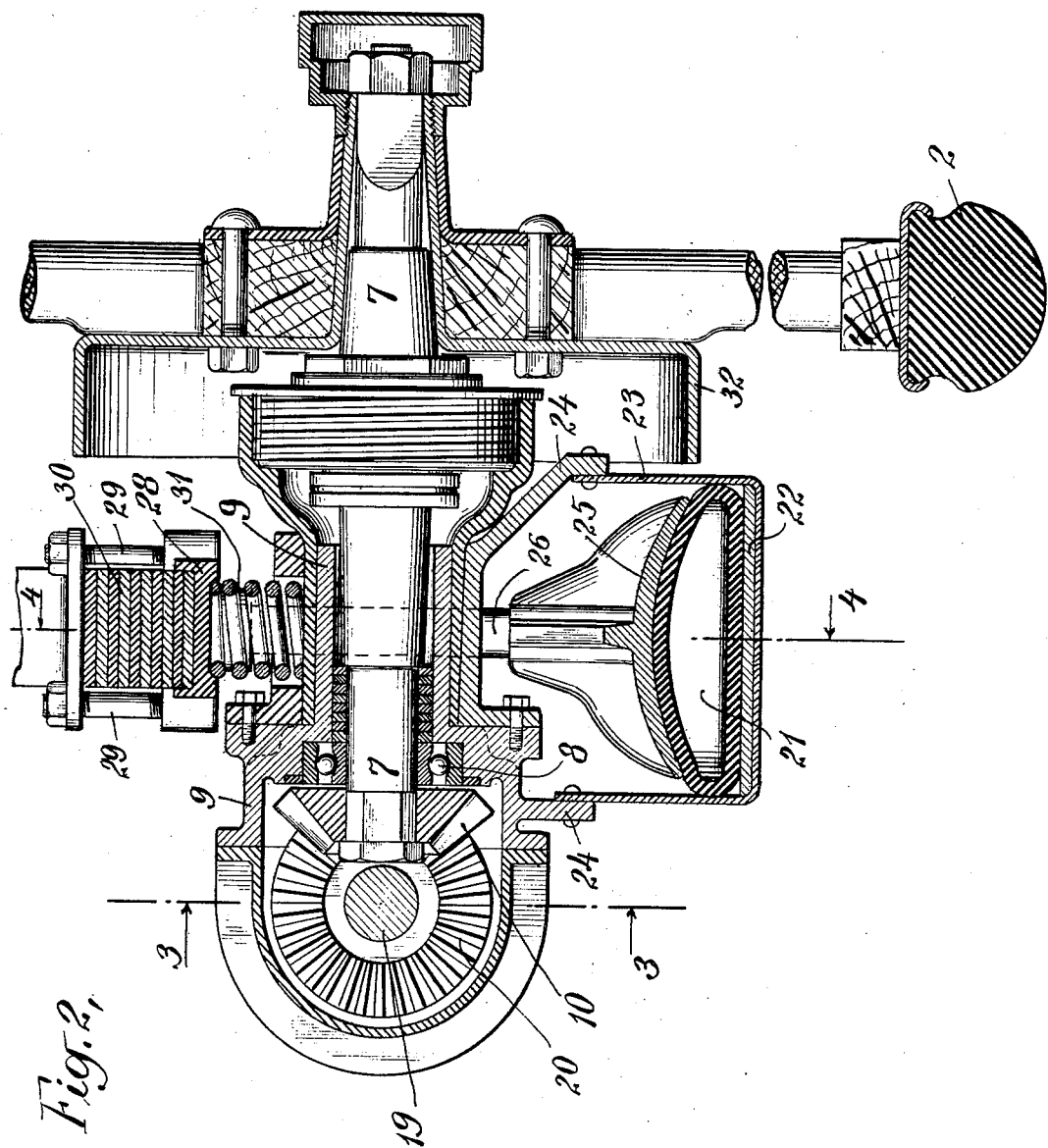
Figure 3:
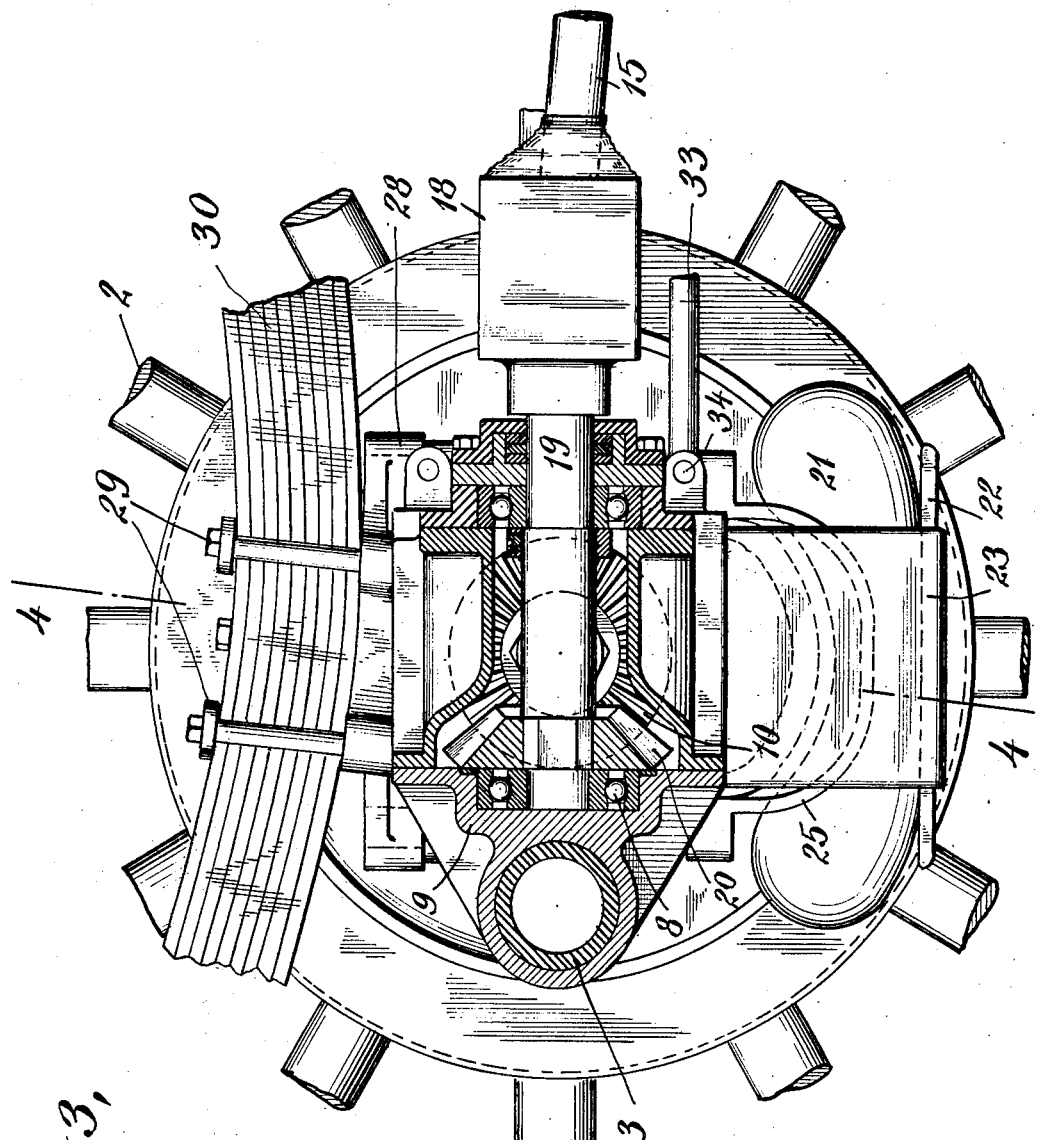

Referring to these drawings, Figure 1 is a plan view of the rear axle and wheels and the differential parts of a shaft driven car with the driving connections between the wheels and the differential; Fig. 2 is a vertical transverse section through a wheel and its connecting parts taken on the lines 2—2 of Fig. 1; Fig. 3 is a longitudinal vertical section through a part of the driving connections with one of the wheels taken on the lines 3—3 of Figs. 1 and 2; Fig. 4 is a vertical longitudinal section taken on the lines 4—4 of Figs. 1 and 2; Fig. 5 is a rear view of part of the rear axle and one wheel and connections; Fig. 6 is a vertical transverse section on the lines 6—6 of Fig. 4; and Fig. 7 is a similar section taken on the lines 7—7 of Fig. 4.

1 represents the chassis or body of the car, 2, 2 the rear wheels, 3 a solid rear axle, 4 the power shaft leading from the engine and 5 the differential case. The differential may be of any well known variety and is therefore not shown in full. The differential case is carried on the chassis 1 by hangers 6. Each wheel is mounted on a stub-axle 7 to which it is firmly secured. It rotates in bearings 8 forming part of case 9 secured to the rigid rear axle 3. Stub-able 7 carries at its inner end a beveled gear 10.

The driving connections between each wheel and its beveled gear and the differential are separate and distinct from the similar driving connections of the other rear wheel. These connections are so constructed as to be sufficiently flexible to permit vertical play of the wheel relative to the differential and yet furnish a direct and positive drive. Each connection consists of shafts and gearing, preferably beveled gearing, with one or more universal joints to give the flexibility above referred to. The specific mechanism shown consists of a shaft 11 connected with one of the gears of the differential (not shown) having at its outer end a bevel gear 12 (Figs. 6 and 7). This gear meshes with a beveled gear 13 on shaft 14. This shaft is connected with shaft 15 by means of a universal joint 16 shown in dotted lines in Fig. 1 in dust cover 17. A similar universal joint in dust cover 18 connects shaft 15 with short shaft 19. This shaft carries at its other end a beveled gear 20 which meshes with beveled gear 10 on the wheel stub-axle 7. A similar arrangement of shafts, beveled gears and universal joints is provided for driving the other wheel.

21 is a pneumatic cushion carried by the wheel. It is supported between two plates, a lower plate or support 22 carried by a steel band 23 secured to flanges 24 dependent from box 9 and an upper plate or support 25, preferably curved, carried by pins 26 snugly fitting into cylindrical holes 27 of box 9 and secured to piece 28 fastened by bolts and clips 29 to spring 30. Springs 30 are secured in any usual way (not shown) to the body or chassis of the car. The weight of the car rests upon the pneumatic bags 21 through the upper supports 25 and connections. By means of the above construction the wheel and body of the car, including the differential, can have vertical play with reference to one another and the bag can be compressed between its two supports, but these supports are otherwise a unit so far as movement in all other directions than vertical is concerned, thus entirely removing any side strains or stresses from the pneumatic cushion.

I preferably place a spring 31 between the upper part of box 9 and the lower part of spring 30 to prevent the parts striking each other.

32 is the usual brake drum.

33 is a radius rod pivoted at one end 34 to box 9 and at its other end at 35 to the lower end of bracket 36 dependent from the chassis.

37, 37 are spring clamps for holding spring 31 in place.

38 is the gear case inclosing gears 12 and 13.

Inasmuch as the blow upon a wheel traveling along a road comes upon the tire slightly in front of the point on the tire cut by a vertical line drawn from the center of the wheel and the line of pressure, due to the blow, is along a vertically upward and rearwardly inclined line to the vertical, I preferably tilt pins 26, box 9, piece 28 and connecting parts so that the pneumatic cushion is held slightly in advance of a vertical line dropped from the center of the wheel. This is clearly shown in Figs. 3 and 4. This is done by making the right-hand downward projecting portion of piece 28 run a little lower than the left-hand downward projecting portion. This construction prevents binding of the pins 26 in holes 27 and enables all of the parts to work together more easily and efficiently.

By means of my improvement a pneumatic bag can be successfully employed in connection with the driving wheels of a shaft-driven car.

What I claim as new and desire to secure by Letters Patent, is:

1. In a shaft-driven motor vehicle, the combination of a differential connected with the power shaft of the vehicle and mounted on the body of the vehicle, a wheel stub axle for each rear wheel, a shaft and bevel gear connection between each wheel stub axle and the differential containing a universal joint to permit vertical play of the wheel and differential, a pneumatic bag arranged between two supports, so as to be unconfined at its sides and free to expand and contract, one support fast to the wheel stub axle and the other support connected to the body of the vehicle and resting on the pneumatic bag, and connections between the two supports permitting vertical play between them but causing them otherwise to move together as a unit.

2. In a shaft-driven motor vehicle, the combination of a differential connected with the power shaft of the vehicle and mounted on the body of the vehicle, a wheel stub axle for each rear wheel, a shaft and bevel gear connection between each wheel stub axle and the differential containing a universal joint to permit vertical play of the wheel and differential, a pneumatic bag arranged between two supports, so as to be unconfined at its sides and free to expand and contract, the lower support fast to the wheel and the upper support connected to the body of the vehicle, and connections between the two supports permitting vertical play between them but causing them to move together in all other directions as a unit.

3. In a shaft-driven motor vehicle, the combination of a differential connected with the power shaft of the vehicle and mounted on the body of the vehicle, a fixed solid rear axle connected to the wheels of the vehicle, a wheel stub axle for each rear wheel, a shaft and bevel gear connection between each wheel stub axle and the differential containing a universal joint to permit vertical play of the wheel and differential, a pneumatic bag arranged between two supports, so as to be unconfined at its sides and free to expand and contract, the lower support rigidly connected with the rear fixed axle and the upper support carried by the body of the vehicle and resting on the pneumatic bag, and connections between the two supports permitting vertical play between them but causing them to move together in all other directions as a unit.

4. In a shaft-driven motor vehicle, the combination of a differential connected with the power shaft of the vehicle and mounted on the body of the vehicle, a wheel stub axle for each rear wheel, a shaft and bexel gear connection between each wheel stub axle and the differential containing universal joints to permit vertical play of the wheel and differential, a pneumatic bag arranged between two supports, so as to be unconfined at its sides and free to expand and contract, one support fast to the wheel stub axle and the other support connected to the body of the vehicle and resting on the pneumatic bag, and connections between the two supports permitting vertical play between them but causing them otherwise to move together as a unit.

5. In a shaft-driven motor vehicle, the combination of a differential connected to the power shaft and mounted on the body of the vehicle, a wheel stub axle for each rear wheel, a separate shaft and bevel gear connection between each wheel stub axle and the differential, each connection containing a universal joint to permit vertical play of the wheel and differential, a pneumatic bag for each rear wheel arranged between two supports, so as to be unconfined at its sides and free to expand and contract, one fast with the wheel stub axle and the other connected with the body of the vehicle, and connections between the two supports permitting vertical play between them but causing them to move together in all other directions as a unit.

6. In a shaft-driven motor vehicle, the combination of a differential connected to the power shaft and mounted on the body of the vehicle, a wheel stub axle for each rear wheel, a flexible driving connection between each wheel stub axle and the differential adapted to permit vertical play of the wheel and differential, a pneumatic bag for each rear wheel arranged between two supports, so as to be unconfined at its sides and free to expand and contract, one support fast to the wheel stub axle and the other connected to the body of the vehicle, and connections between the two supports of each set permitting vertical play between them but causing them to move together in all other directions as a unit.

7. In a shaft-driven motor vehicle, the combination of a differential connected with the power shaft of the vehicle and mounted on the body of the vehicle, a wheel stub axle for each rear wheel, a shaft and bevel gear connection between each wheel stub axle and the differential containing a universal joint to permit vertical play of the wheel and differential, a pneumatic bag arranged between two supports, so as to be unconfined at its sides and free to expand and contract, one support fast to the wheel stub axle and the other support connected to the body of the vehicle through a spring, and connections between the two supports permitting vertical play between them but causing them to move rigidly together in all other directions.

8. In a shaft-driven motor vehicle, the combination of a differential connected with the power shaft of the vehicle and mounted on the body of the vehicle, a wheel stub axle for each rear wheel, a shaft and bevel gear connection between each wheel stub axle and the differential containing a universal joint to permit vertical play of the wheel and differential, a pneumatic bag arranged between two supports, so as to be unconfined at its sides and free to expand and contract, one support fast to the wheel stub axle and the other support connected to the body of the vehicle and resting on the pneumatic bag, and connections between the two supports permitting vertical play between them but causing them otherwise to move together as a unit, the pneumatic bag, its supports and connections being all so arranged that the said supports and bag will be arranged along a line drawn from the center of the wheel running downwardly slightly forward of a perpendicular from the center of the wheel.

In testimony whereof, I have signed my name to this specification, in the presence of two subscribing witnesses.

THEODORE A. KLENKE.

Witnesses:
  EDWIN SEGER,
  JOHN O. GEMPLER.